(12) United States Patent
Choi (10) Patent No.: US 10,106,186 B2
(45) Date of Patent: Oct. 23, 2018

(54) BABY WAGON WITH IMPROVED EASE OF USE

(71) Applicant: BRAN-NEW INTERNATIONAL, Seoul (KR)

(72) Inventor: Yejin Choi, Sacheon-si (KR)

(73) Assignee: BRAN-NEW INTERNATIONAL, Seoul (KR)

( * ) Notice: Subject to any disclaimer, the term of this patent is extended or adjusted under 35 U.S.C. 154(b) by 0 days.

(21) Appl. No.: 15/578,620

(22) PCT Filed: Apr. 8, 2016

(86) PCT No.: PCT/KR2016/003731
§ 371 (c)(1),
(2) Date: Nov. 30, 2017

(87) PCT Pub. No.: WO2017/007114
PCT Pub. Date: Jan. 12, 2017

(65) Prior Publication Data
US 2018/0170418 A1   Jun. 21, 2018

(30) Foreign Application Priority Data
Jul. 3, 2015   (KR) ......................... 10-2015-0095065

(51) Int. Cl.
*B62B 7/00* (2006.01)
*B62B 7/08* (2006.01)
(Continued)

(52) U.S. Cl.
CPC ................ *B62B 7/08* (2013.01); *B29C 35/02* (2013.01); *B62B 3/02* (2013.01); *B62B 7/00* (2013.01);
(Continued)

(58) Field of Classification Search
CPC .... B62B 7/06; B62B 7/08; B62B 7/10; B62B 9/08; B62B 9/082; B62B 9/087;
(Continued)

(56) References Cited

U.S. PATENT DOCUMENTS 6,260,566 B1 * 7/2001 LaFave .................... B62J 17/08
 135/88.01
6,263,893 B1 * 7/2001 Spinella .................... B60J 7/10
 135/119
(Continued)

FOREIGN PATENT DOCUMENTS

KR   10-1999-0042198 A   6/1999
KR   20-0308908 Y1   3/2003
(Continued)

*Primary Examiner* — Katy M Ebner
(74) *Attorney, Agent, or Firm* — Novick, Kim & Lee, PLLC; Jae Youn Kim (57) ABSTRACT

Provided herein is a baby wagon with improved ease of use configured such that the volume of the bulky body of the baby wagon is minimized in a wagon folding mode, whereby it is possible to easily put the baby wagon in the trunk of a small-sized car, such that frames are completely fixed in the wagon folding mode, whereby it is possible to prevent damage to the frames due to protrusion of the frames when the baby wagon shakes or is laid down, and such that brakes are mounted to the front and rear parts of the baby wagon in order to easily move or stop the baby wagon in opposite directions, whereby it is possible to improve the ease of use. The baby wagon includes a folding type body frame, a wagon wheel unit, a seat unit, and a canopy.

3 Claims, 11 Drawing Sheets

(51) Int. Cl.
    *B29C 35/02* (2006.01)
    *B62B 9/00* (2006.01)
    *B62B 9/08* (2006.01)
    *B62B 9/14* (2006.01)
    *C08K 5/00* (2006.01)
    *C08K 7/04* (2006.01)
    *C08L 63/00* (2006.01)
    *B62B 3/02* (2006.01)

(52) U.S. Cl.
    CPC ............... *B62B 9/00* (2013.01); *B62B 9/08*
            (2013.01); *B62B 9/14* (2013.01); *C08K 5/00*
            (2013.01); *C08K 7/04* (2013.01); *C08L 63/00*
            (2013.01)

(58) Field of Classification Search
    CPC .. B62B 9/12; B62B 9/14; B62B 9/142; B62B
            9/147; B62B 9/20; B62B 9/203; B62B
            9/26; B62B 3/02; B62B 3/022; B62B
            3/007
    See application file for complete search history.

(56)            References Cited

U.S. PATENT DOCUMENTS

| | | | | |
|---|---|---|---|---|
| 6,454,340 | B1 * | 9/2002 | Miller | B60J 7/10 135/136 |
| 7,963,530 | B1 * | 6/2011 | Garcia | B62B 3/02 280/28 |
| 9,085,311 | B1 * | 7/2015 | Chen | B62B 3/007 |
| 9,580,095 | B2 * | 2/2017 | Vargas, II | B62B 3/02 |
| 9,815,355 | B2 * | 11/2017 | Byrne | B60J 7/106 |
| 2007/0182198 | A1 * | 8/2007 | Michelau | B62B 9/147 296/100.06 |
| 2010/0090444 | A1 * | 4/2010 | Chen | B62B 3/007 280/651 |
| 2010/0156069 | A1 * | 6/2010 | Chen | B62B 3/007 280/639 |
| 2011/0025005 | A1 * | 2/2011 | Howell | B62B 3/007 280/47.24 |
| 2012/0235372 | A1 * | 9/2012 | Herlitz | B62B 7/04 280/47.38 |
| 2013/0015629 | A1 * | 1/2013 | Bengtzen | A45C 9/00 280/30 |
| 2015/0151771 | A1 * | 6/2015 | Jin | B62B 3/027 280/651 |
| 2015/0329135 | A1 * | 11/2015 | Sun | B62B 9/24 280/649 |

FOREIGN PATENT DOCUMENTS

| | | |
|---|---|---|
| KR | 10-2012-0030621 A | 3/2012 |
| KR | 20-0464952 Y1 | 2/2013 |
| KR | 20-0476857 Y1 | 4/2015 |

* cited by examiner

BABY WAGON WITH IMPROVED EASE OF USE

TECHNICAL FIELD

The present invention relates to a baby wagon with improved ease of use configured such that a volume of a bulky body of the baby wagon is minimized in a wagon folding mode, whereby it is possible to easily put the baby wagon in a trunk of a small-sized car, such that frames are completely fixed in the wagon folding mode, whereby it is possible to prevent damage to the frames due to protrusions of the frames when the baby wagon shakes or is laid down, and wherein brakes are mounted to the front and rear parts of the baby wagon in order to easily move or stop the baby wagon in opposite directions, such that it is possible to improve the ease of use.

BACKGROUND ART

A baby carriage, which provides safety and comfort to a baby and reduces fatigue of a caregiver when out of the house, is a necessary article for homes with babies. In a case in which the caregiver goes out with two or more babies or children, however, it is difficult for the lone caregiver to care for the babies or children. In addition, a space defined in the baby carriage for receiving supplies for babies, such as spare clothes, diapers, and blankets, is insufficient. As a result, it is necessary for the caregiver to carry a separate bag on his/her shoulder or to hold the separate bag in his/her hand. This requires a considerable physical strength on the part of the caregiver.

In order to solve the above problems, handcart type baby wagons configured to have a sufficient receiving space and configured to be capable of enabling a lone caregiver to carry two or more babies when out of the house have been developed and commercially used. However, a conventional baby wagon has problems in that a volume of the baby wagon is large when the baby wagon is folded, in that the baby wagon is configured to have an integrated structure in which the structural elements of the baby wagon are coupled to each other by welding or riveting such that it is not easy to put the baby wagon in a trunk of a small-sized car, whereby a portability of the baby wagon is reduced, in that frames constituting the baby wagon are not completely fixed when the baby wagon is in a folded state, whereby the frames may be damaged and the caregiver may be injured, and in which handles are basically formed at a front and a rear parts of the baby wagon in order to push the baby wagon in opposite directions; however, a brake is mounted only at rear wheels, and thus when the caregiver wishes to stop the baby wagon while the caregiver pushes or pulls the baby wagon from a front of the baby wagon in a rearward direction in order to move the baby wagon, the caregiver must return to a rear of the baby wagon in order to step on the brake.

DISCLOSURE

Technical Problem

The present invention has been made in view of the above problems, and it is an object of the present invention to provide a baby wagon with improved ease of use configured such that a lone caregiver can easily and safely care for two or three babies or children when out of the house, such that a riding comfort of the babies is improved, and such that a large amount of supplies for babies can be loaded in the baby wagon, and further configured such that a volume of the bulky body of the baby wagon can be minimized in a wagon folding mode, whereby it is possible to easily put the baby wagon in a trunk of a small-sized car, such that frames are completely fixed in the wagon folding mode, whereby it is possible to prevent damage to the frames due to protrusions of the frames when the baby wagon shakes or is laid down, and such that brakes are mounted to the front and rear parts of the baby wagon in order to easily move or stop the baby wagon in opposite directions, whereby it is possible to improve the ease of use.

Technical Solution

In accordance with the present invention, the above object can be accomplished by a provision of a baby wagon with improved ease of use, the baby wagon including:

a folding type body frame formed to have a rectangular parallelepiped shape so as to support the entire body of the baby wagon (1), the folding type body frame being configured such that a middle part of the folding type body frame can be folded or unfolded in a forward-rearward direction, such that the shape of the folding type body frame is variable;

a wagon wheel unit fastened to a front lower end and a rear lower end of the folding type body frame in order to move the baby wagon;

a seat unit formed in a rectangular shaped basket, the seat unit being coupled and fixed to an inner circumference and a lower end of the folding type body frame using snap fasteners, buckles, or hook and loop fasteners; and a canopy having rectangular sides and a quadrangular pyramid-shaped roof, the canopy being detachably coupled to an upper end of the folding type body frame.

Advantageous Effects

As is apparent from the above description, the baby wagon with improved ease of use according to the present invention has effects in that a lone caregiver can easily and safely care for two or three babies or children when out of the house, in that a riding comfort of the babies is improved, and in that a large amount of supplies for babies can be loaded in the baby wagon. Furthermore, the baby wagon with improved ease of use according to the present invention has effects in that the volume of the bulky body of the baby wagon is minimized in a wagon folding mode, whereby it is possible to easily put the baby wagon in a trunk of a small-sized car, in that frames are completely fixed in the wagon folding mode, whereby it is possible to prevent damage to the frames due to protrusions of the frames when the baby wagon shakes or is laid down, and in that brakes are mounted to a front and a rear parts of the baby wagon in order to easily move or stop the baby wagon in opposite directions, whereby it is possible to improve the ease of use.

DESCRIPTION OF REFERENCE NUMERALS

100: Folding type body frame 110: Main frame
120: Support frame 130: Side frames
140: Front handle frame 150: Rear handle frame
200: Wagon wheel unit 210: Front wheel drive unit
220: Rear wheel drive unit 300: Seat unit
400: Canopy

BEST MODE

A baby wagon with improved ease of use, comprising:
a folding type body frame (100) formed to have a rectangular parallelepiped shape so as to support an entire body of the baby wagon (1), the folding type body frame being configured such that a middle part of the folding type body frame can folded or unfolded in a forward-rearward direction, such that a shape of the folding type body frame is variable;
a wagon wheel unit (200) fastened to a front lower end and a rear lower end of the folding type body frame in order to move the baby wagon;
a seat unit (300) formed in a shape of a rectangular basket, the seat unit being coupled and fixed to an inner circumference and a lower end of the folding type body frame using snap fasteners, buckles, or hook and loop fasteners; and
a canopy (400) having rectangular sides and a quadrangular pyramid-shaped roof, the canopy being detachably coupled to an upper end of the folding type body frame.

Preferred Embodiments of Invention

Hereinafter, preferred embodiments of the present invention will be described with reference to the accompanying drawings.

Figure 1:
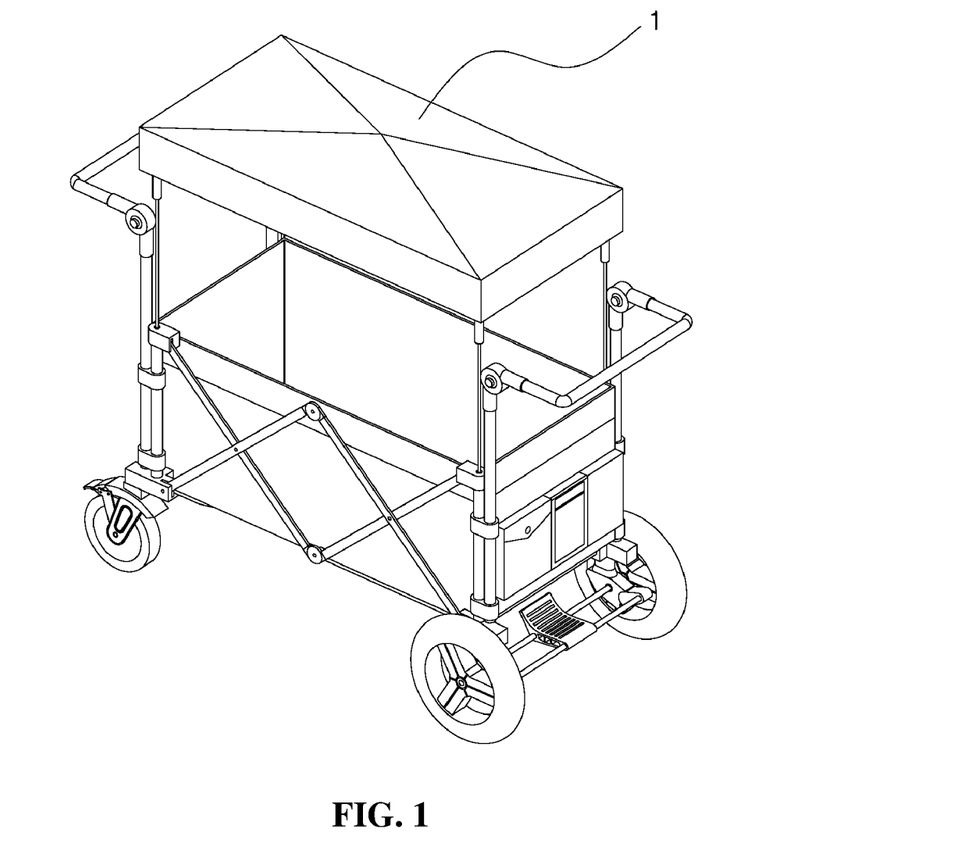
FIG. 1 is a perspective view showing an overall shape of a baby wagon with improved ease of use according to the present invention.

FIG. 1 is a perspective view showing an overall shape of a baby wagon with improved ease of use according to the present invention. The baby wagon includes a folding type body frame 100, a wagon wheel unit 200, a seat unit 300, and a canopy 400.

In the first place, the folding type body frame 100 according to the present invention will be described.

The folding type body frame 100 is formed to have a rectangular parallelepiped shape so as to support the entire body of the baby wagon 1. The folding type body frame 100 is configured such that a middle part of the folding type body frame 100 can be folded or unfolded in a forward-rearward direction, such that the shape of the folding type body frame 100 is variable.

Figure 2:
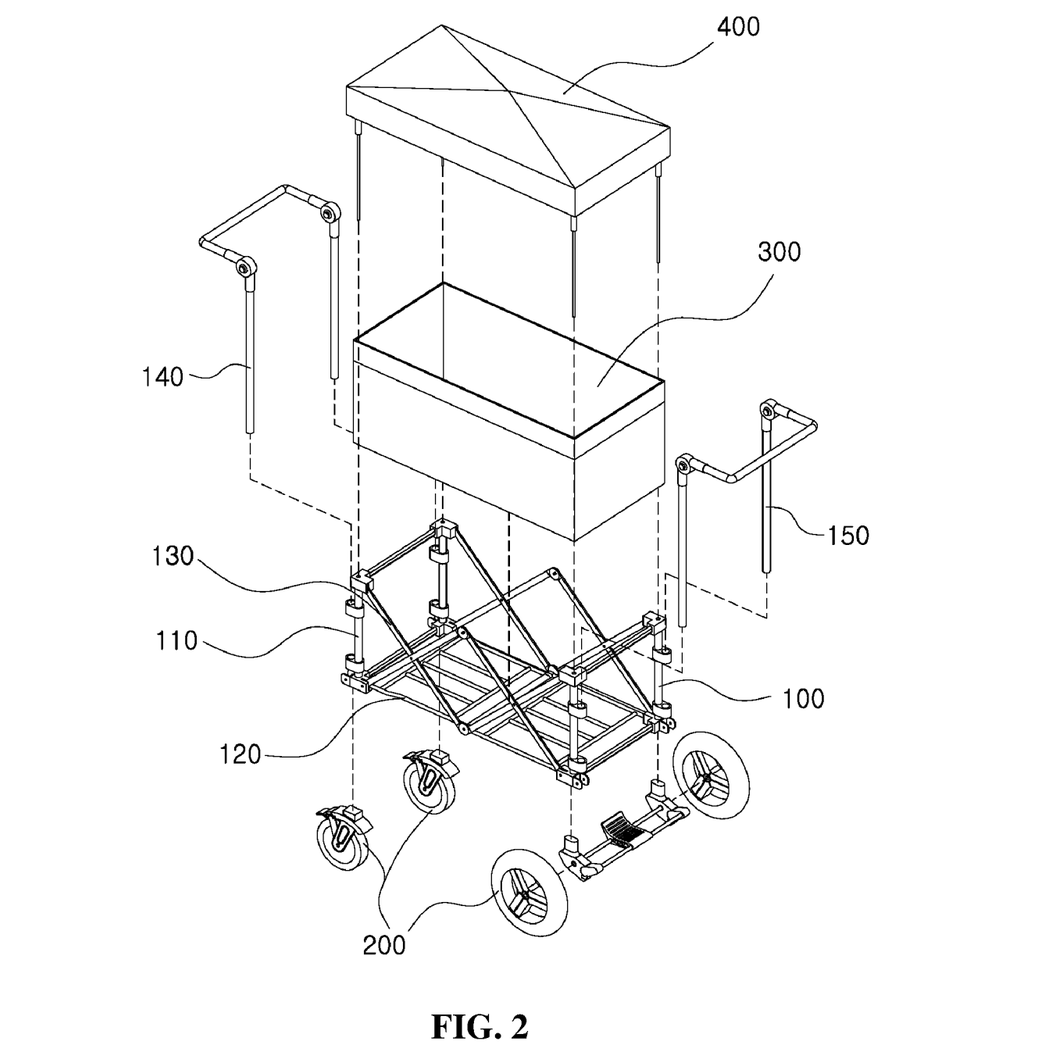
FIG. 2 is an exploded perspective view showing the structural elements of the baby wagon according to the present invention.

As shown in FIG. 2, the folding type body frame 100 includes a main frame 110, a support frame 120, side frames 130, a front handle frame 140, and a rear handle frame 150.

First, the main frame 110 according to the present invention will be described.

The main frame 110 is a quadrangular frame disposed vertically at opposite ends of the wagon in the forward-rearward direction. The main frame 110 supports the folding type body frame 100. The main frame 110 includes a front main frame 110a and a rear main frame 110b, each of which is configured such that left and right cylindrical frame parts thereof, which are disposed vertically, move upward and downward in a telescopic fashion, whereby the heights of the front main frame 110a and the rear main frame 110b are variable.

The main frame 110 according to the present invention can be used as follows in a wagon folding mode or in a wagon using mode as needed. In the wagon folding mode, inner cylindrical frame parts 110a-1 move upward so as to protrude upward from outer cylindrical frame parts 110a-2 according to the upward turning of inverted triangular frame parts, which are coupled to upper end biaxial support fixing members 111. In the wagon using mode, the inner cylindrical frame parts 110a-1 move downward so as to be inserted into the outer cylindrical frame parts 110a-2 according to the downward turning of the inverted triangular frame parts, which are coupled to the upper end biaxial support fixing members 111.

Figure 3:
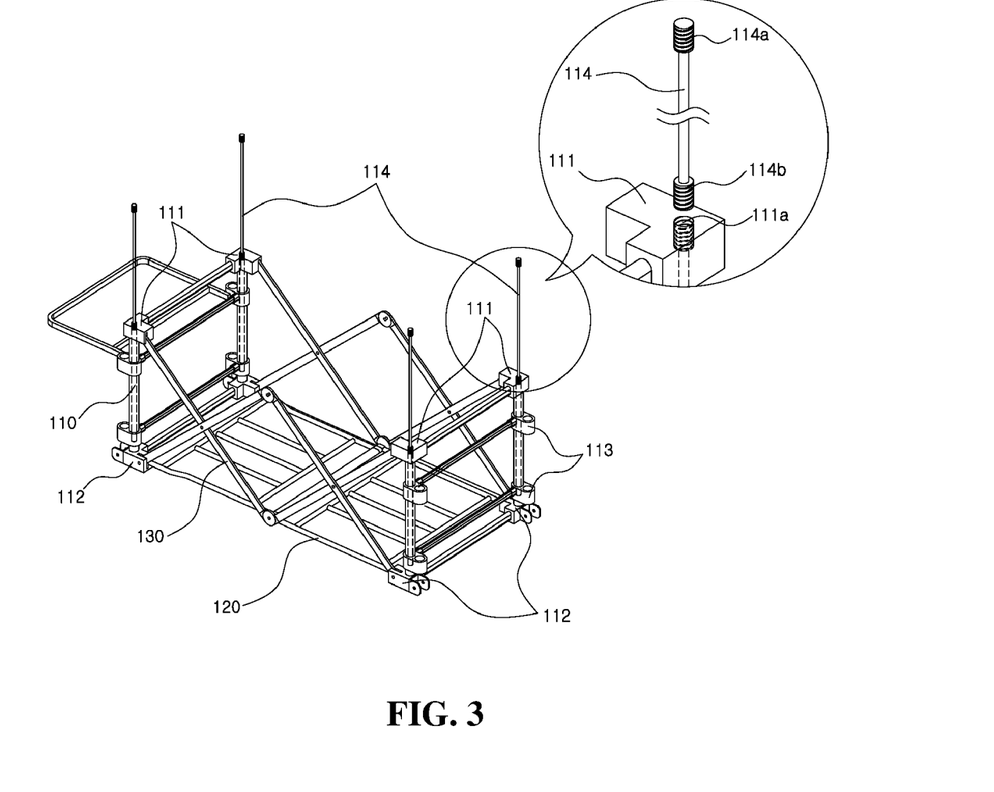
FIG. 3 is a view showing a main frame, a support frame, and side frames according to the present invention, with a partially enlarged view showing a way in which a canopy fixing pole is inserted.
Figure 4:
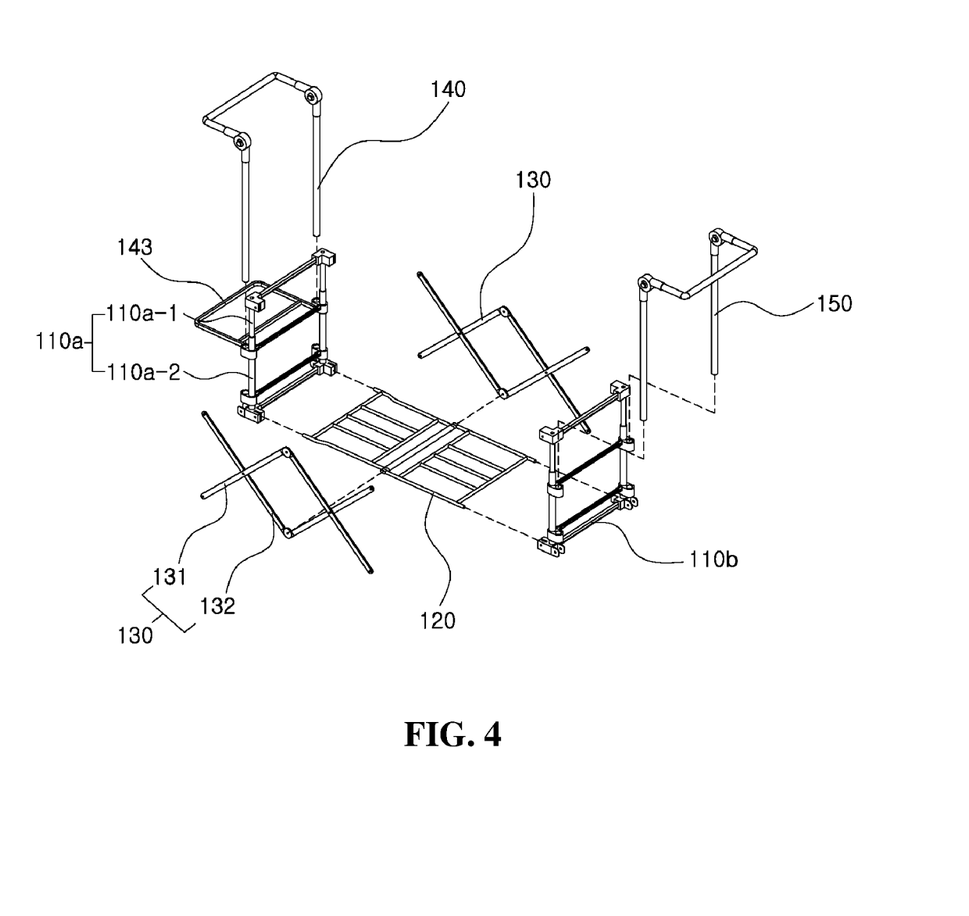
FIG. 4 is an exploded perspective view showing the structural elements of a folding type body frame according to the present invention.

As shown in FIG. 3, the main frame 110 includes upper end biaxial support fixing members 111, lower end triaxial support fixing members 112, handle fixing clips 113, and canopy fixing poles 114.

Each of the upper end biaxial support fixing members 111 is formed in a '¬' shape. The upper end biaxial support fixing members 111 are fixedly coupled to the left and right upper ends of the inner cylindrical frame parts of the main frame 110, disposed at the opposite ends of the wagon in the forward-rearward direction, in a symmetrical fashion. Each of the upper end biaxial support fixing members 111 is provided with a pole insertion fixing hole 111a, which has a screw thread formed in the upper end thereof. The upper end biaxial support fixing members 111 are coupled to the upper ends of the inverted triangular frame parts 132 via pins in order to assist the turning of the inverted triangular frame parts 132.

In addition, the canopy fixing poles 114 respectively extend downward through the respective pole insertion fixing holes 111a formed respectively in the upper end biaxial support fixing members 111 so as to be inserted into the main frame 110. Each of the upper end biaxial support fixing members supports a pole insertion fixing screw thread 114a formed on an upper end of a respective one of the canopy fixing poles 114 and a pole insertion protrusion screw thread 114b formed on a lower end of the respective one of the canopy fixing poles 114 through engagement with the screw thread formed in an upper end of a respective one of the pole insertion fixing holes 111a.

When the canopy 400 is installed, the pole insertion fixing holes 111a are coupled to the pole protrusion fixing screw threads 114b located at the lower ends of the canopy fixing poles 114, such that the canopy fixing poles are disposed vertically at the upper end of the main frame 110. When the canopy 400 is removed, the pole insertion fixing holes 111a are coupled to the pole insertion fixing screw threads 114a located at the upper ends of the canopy fixing poles 114, such that the canopy fixing poles 114 are inserted into and fixed in the main frame 110.

When the baby wagon is stored or carried in the folded state, therefore, the canopy fixing poles 114 are fixed, whereby it is possible to prevent the separation or loss of the canopy fixing poles 114 and to prevent damage to the frame and the injury of a user due to the dropping of the canopy fixing poles 114.

Each of the lower end triaxial support fixing members 112 is formed in a '¬' shape. The lower end triaxial support fixing members are fixedly coupled to the left and right lower ends of the outer cylindrical frame parts of the main frame 110, formed at the opposite ends of the wagon in the forward-rearward direction, in a symmetrical fashion. The lower end triaxial support fixing members 112 are coupled to the ends of triangular frame parts 131 via pins in order to assist the turning of the triangular frame parts 131.

Each of the lower end triaxial support fixing members 112 is provided at the lower end thereof with an outer rear wheel support frame part 112a, which is formed so as to have a cylindrical shape. An inner rear wheel support frame part 221b, the outer circumference of which has a size equal to the size of the inner circumference of the outer rear wheel support frame part 112a, is inserted into the outer rear wheel support frame part 112a from beneath. The outer rear wheel support frame part 112a is provided at the front side thereof with an outer through hole 112a-1.

The handle fixing clips 113 serve to fix the lower ends of the front handle frame 140 and the rear handle frame 150 and the lower ends of the main frame 110 while surrounding the lower ends of the front handle frame 140 and the rear handle frame 150 and the lower ends of the main frame 110. The handle fixing clips 113 securely couple the front handle frame 140 and the rear handle frame 150 to the main frame 110 such that, when a caregiver pushes or pulls the baby wagon or changes the direction of the baby wagon while holding one of the handle frames, the loss of force is minimized, whereby it is possible for the caregiver to easily control the baby wagon even when the caregiver pushes the baby wagon alone, and therefore it is possible to reduce the unnecessary exertion of physical strength of the caregiver.

The handle fixing clips 113 according to the present invention are coupled to the upper and lower ends of the left and right frame parts of the front main frame 110a and to the upper and lower ends of the left and right frame parts of the rear main frame 110b using bolts. The handle fixing clips 113 may be made of plastic.

Consequently, the front handle frame 140 and the rear handle frame 150 may be separated from the main frame 110, whereby it is possible to minimize a protruding structure in the wagon folding mode such that the wagon can be easily stored in a small space or in a small-sized car or such that the wagon can be easily carried. In addition, since the handle fixing clips 113 are made of plastic and the front handle frame 140 and the rear handle frame 150 can be separated from the main frame 110 through the handle fixing clips 113, the weight of the wagon can be reduced, whereby the wagon can be easily carried.

In addition, each of the handle fixing clips 113, which are formed at the left and right sides of the upper end of the front of the main frame 110 in order to couple the front handle frame 140 to the front main frame 110a, is provided at an inner side thereof with a guide rail 113a for moving a basket coupling frame 143 in order to change the fixing angle of the basket coupling frame 143 and fixing pin insertion holes.

Figure 5:
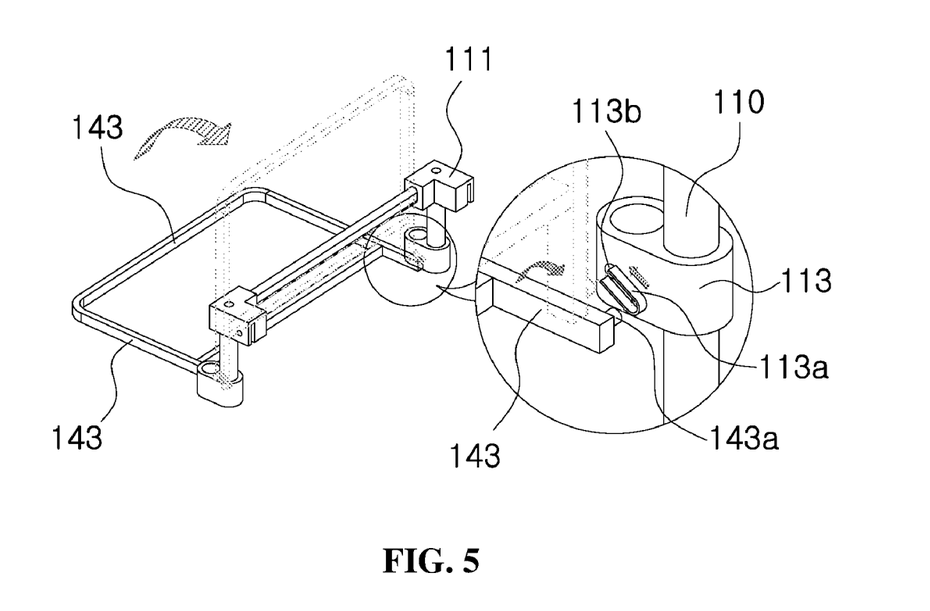
FIG. 5 is a view showing an embodiment in which a basket using mode is changed to a basket folding mode through the rotation of a basket coupling frame fixed in an upper end biaxial support fixing member according to the present invention, with an enlarged view showing a state in which the basket coupling frame is installed depending on the movement of a basket fixing pin.
Figure 6:
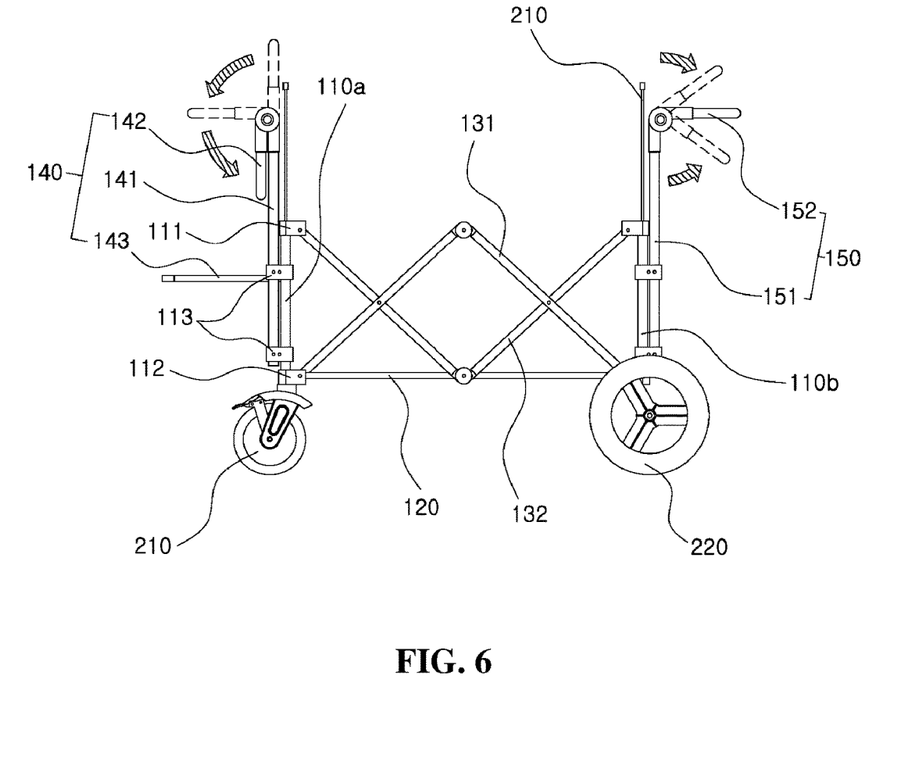
FIG. 6 is a side view showing the folding type body frame and a wagon wheel unit according to the present invention.

As shown in FIG. 5, each of the handle fixing clips 113 can be used in a basket using mode, in which a basket fixing pin 143a is inserted into one of the fixing pin insertion holes formed in the rear end of the guide rail formed in the diagonal direction such that the basket coupling frame 143 lays down so as to be perpendicular to the main frame 110, and in a basket folding mode, in which the basket fixing pin 143a can be inserted into the other of the fixing pin insertion holes formed in the front end of the guide rail such that the basket coupling frame 143 can be disposed vertically so as to be parallel to the main frame 110.

Each of the handle fixing clips 113 according to the present invention is manufactured as follows. A mixture of 79 to 90 wt % of room temperature setting epoxy resin having a viscosity at 25° C. of 700 to 850 cps and a density of 1.21 g/cm$^3$, 2 to 20 wt % of carbon fiber surface-treated with plasma, and 0.5 to 10 wt % of a hardening agent, such as imidazole or tertiary amine (benzyl dimethyl amine), is injected into a mold. Subsequently, the mixture is hardened through a first hardening step, in which the temperature thereof is increased from 50° C. to 80° C. for 15 minutes, a second hardening step, in which the temperature thereof is maintained at 80° C. for 25 minutes, a third hardening step, in which the temperature thereof is increased from 80° C. to 120° C. for 20 minutes, a fourth hardening step, in which the temperature thereof is maintained at 120° C. for 90 minutes, and a fifth hardening step, in which the temperature thereof is decreased from 120° C. to 50° C. for 30 minutes.

The surface of the carbon fiber is treated with plasma in order to increase the coupling force with the epoxy resin, whereby high durability is achieved.

The plasma surface treatment is performed for 10 to 60 seconds using Ar, $N_2$, or $O_2$. At this time, gas is injected at a speed of 3.15×10-5 m$^3$/s in a standard gas state, and plasma surface treatment commences about 30 seconds thereafter.

In a specific example, each of the handle fixing clips 113 is manufactured using a mixture of 85 wt % of room temperature setting epoxy resin, 10 wt % of carbon fiber surface-treated with plasma, and 5 wt % of tertiary amine (benzyl dimethyl amine).

The amount of room temperature setting epoxy resin and carbon fiber surface-treated with plasma that are used affects the durability of each of the handle fixing clips 113. Preferably, 79 to 90 wt % of room temperature setting epoxy resin and 2 to 20 wt % of carbon fiber surface-treated with plasma are used.

In addition, the mixture undergoes a plurality of hardening steps in order to securely couple the epoxy resin and the carbon fiber to each other, whereby the durability of each of the handle fixing clips 113 according to the present invention is improved.

Each of the canopy fixing poles 114 can be formed in a circular rod shape having identical screw threads formed at the upper end and the lower end thereof. Each of the canopy fixing poles 114 can be inserted from above the main frame 110. The pole protrusion fixing screw thread 114b, which is formed on the lower end of each of the canopy fixing poles 114, and the pole insertion fixing screw thread 114a, which is formed on the upper end of each of the canopy fixing poles 114, can be selectively engaged with the screw thread disposed in the pole insertion fixing hole 111a, which is formed in the upper end of a respective one of the upper end biaxial support fixing members 111.

When the canopy is installed, the pole protrusion fixing screw thread 114b, which is formed on the lower end of each of the canopy fixing poles 114, can be fixed in the pole insertion fixing hole 111a formed in the upper end of the respective one of the upper end biaxial support fixing members 111. In the canopy separating and folding mode, the pole insertion fixing screw thread 114a, which is formed on the upper end of each of the canopy fixing poles 114, can be fixed in the pole insertion fixing hole 111a formed in the upper end of the respective one of the upper end biaxial support fixing members 111.

Consequently, the canopy fixing poles 114 can be stably fixed in the canopy separating and folding mode, in which the canopy fixing poles 114 are inserted into the main frame 110 from above the main frame 110, as well as in the state in which the canopy is installed, i.e., in the state in which the canopy fixing poles 114 are disposed vertically, whereby it is possible to prevent damage to the canopy fixing poles 114, such as bending of the canopy fixing poles 114, due to a protrusion of the canopy fixing poles 114, to prevent a safety-related accident of a user, and to prevent the loss of the canopy fixing poles 114 due to separation of the canopy fixing poles 114 when the baby wagon is pushed.

Second, the support frame 120 according to the present invention will be described.

The support frame 120 is a rectangular frame coupled to the lower end of the main frame 110. The support frame 120 is provided at the middle thereof in the forward-rearward direction with a center shaft. The support frame 120 can be folded or unfolded in a symmetrical fashion according to the upward and downward movement of the center shaft, whereby the shape of the support frame 120 may be changed.

In the wagon using mode, in which the baby wagon is used, front and rear support frame parts of the support frame 120 are arranged parallel to the center shaft in order to provide a space in which the seat unit 400 can be unfolded. In the wagon folding mode, the front and rear support frame parts of the support frame 120 can be folded in a 'V' shape in a symmetrical fashion with respect to the center shaft, whereby the volume of the support frame 120 can be reduced.

Third, the side frames 130 according to the present invention will be described.

The side frames 130 are respectively coupled to the left side and the right side of the main frame 110 in a symmetrical fashion so as to be supported by the main frame 110. Each of the side frames 130 includes a triangular frame part 131 and an inverted triangular frame part 132, which have the same height and are formed in a symmetrical fashion. The triangular frame part 131 and the inverted triangular frame part 132 are coupled to each other so as to intersect each other about rotating pins inserted into the middle parts of opposite sides thereof.

The triangular frame part 131 and the inverted triangular frame part 132, which are formed in a symmetrical fashion, have the same contained angles. When the triangular frame part 131 and the inverted triangular frame part 132 are turned about the rotating pins, which are inserted into the middle parts of the opposite sides thereof, the triangular frame part 131 and the inverted triangular frame part 132 move in the state in which the contained angles thereof are changed equally.

When the center shaft of the support frame 120 is moved upward, the triangular frame part 131 and the inverted triangular frame part 132 are turned about the rotating pins such that the contained angles thereof are decreased and the length of the support frame 120 in the forward-rearward direction is decreased, whereby the baby wagon can be folded. When the center shaft of the support frame 120 is moved downward, the triangular frame part 131 and the inverted triangular frame part 132 are turned about the rotating pins such that the contained angles thereof are increased and the length of the support frame 120 in the forward-rearward direction is increased, whereby the baby wagon can be unfolded.

Fourth, the front handle frame 140 according to the present invention will be described.

The front handle frame 140 is coupled to the front main frame 110a via the handle fixing clips 113 so as to be disposed vertically at the left and right front parts of the main frame 110. Rotation control buttons are coupled to the outside surfaces of rotating shafts formed at the left and right upper ends of the front handle frame 140 in order to control, in a stepwise manner, the angle of a front angle adjustment handle 142.

The front angle adjustment handle 142 is configured such that the angle of the front angle adjustment handle 142 can be adjusted in a stepwise manner through button adjustment type rotation. The angle of the front angle adjustment handle 142 may be selectively set by the user in the state in which the rotation control buttons, located at the left and right sides of the front handle frame 140, are pushed.

The front angle adjustment handle 142 can be rotated in ten stages from 0 degrees, at which the front angle adjustment handle is folded in the state in which the front angle adjustment handle 142 is parallel to a front support frame part 141, to 180 degrees, at which the front angle adjustment handle 142 is disposed vertically in the opposite direction.

At the time of a first-step rotation, the front angle adjustment handle 142 is rotated by 18 degrees. The angle of the front angle adjustment handle 142 may be changed depending on the height of a user, the position of the arms of the user, the presence of an upward slope or a downward slope, or whether the front angle adjustment handle 142 is being pushed or pulled by the user in order to move the baby wagon forward, whereby the force applied to the arms of the user may be minimized. In the wagon folding mode, the front angle adjustment handle 142 and the front support frame part 141 are disposed parallel to each other, whereby the volume of the baby wagon may be minimized.

Also, in the case in which the angle of the front angle adjustment handle 142 is set to be vertical when the front handle frame 140 is pushed to move the baby wagon, the distance between the feet of the caregiver and the baby wagon is maximized, whereby it is possible to prevent a kickback phenomenon in which the foot of the caregiver, who steps forward when the caregiver walks, collides with the baby wagon. Consequently, it is possible for the caregiver to walk comfortably, and it is also possible to improve the riding comfort of the baby.

Fifth, the rear handle frame 150 according to the present invention will be described.

The rear handle frame 150 is coupled to the rear main frame 110b via the handle fixing clips 113 so as to be disposed vertically at the left and right rear parts of the main frame 110. Rotation control buttons are coupled to the outside surfaces of rotating shafts formed at the left and right upper ends of the rear handle frame 150 in order to control, in a stepwise manner, the angle of a rear angle adjustment handle 152.

The rear angle adjustment handle 152 is configured such that the angle of the rear angle adjustment handle 152 can be adjusted in a stepwise manner through button adjustment type rotation. The angle of the rear angle adjustment handle 152 may be selectively set by the user in the state in which the rotation control buttons, located at the left and right sides of the rear handle frame 150, are pushed.

The rear angle adjustment handle 152 can be rotated in ten stages from 0 degrees, at which the rear angle adjustment handle 152 is folded in the state in which the rear angle adjustment handle 152 is parallel to a rear support frame part 151, to 180 degrees, at which the rear angle adjustment handle 152 is disposed vertically in the opposite direction.

At the time of a first-step rotation, the rear angle adjustment handle 152 is rotated by 18 degrees. The angle of the rear angle adjustment handle 152 may be changed depending on the height of the user, the position of the arms of the user, the presence of an upward slope or a downward slope, or whether the rear angle adjustment handle 152 is being pushed or pulled by the user in order to move the baby wagon forward, whereby the force applied to the arms of the user may be minimized. In the wagon folding mode, the rear angle adjustment handle 152 and the rear support frame part 151 are disposed parallel to each other, whereby the volume of the baby wagon may be minimized.

Also, in the case in which the angle of the rear angle adjustment handle 152 is set to be vertical when the rear handle frame 150 is pushed to move the baby wagon, the distance between the feet of the caregiver and the baby wagon is maximized, whereby it is possible to prevent a kickback phenomenon in which the foot of the caregiver, who steps forward when the caregiver walks, collides with the baby wagon. Consequently, it is possible for the caregiver to walk comfortably, and it is also possible to improve the riding comfort of the baby.

Next, the wagon wheel unit 200 according to the present invention will be described.

The wagon wheel unit 200 can be fastened to the front lower end and the rear lower end of the folding type body frame 100 in order to move the baby wagon.

Figure 7:
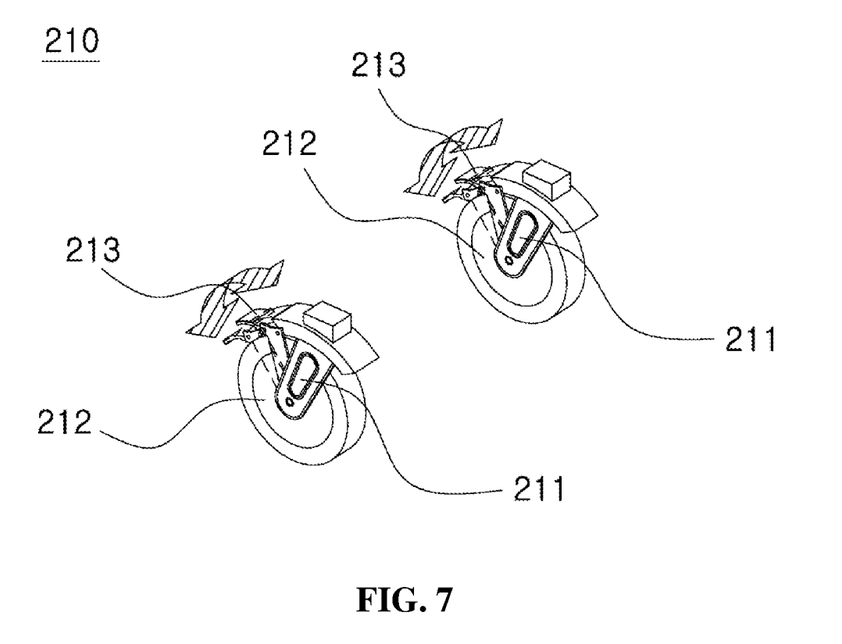
FIG. 7 is a perspective view showing the structural elements of a front wheel drive unit according to the present invention and also showing the rotational direction of a push friction type brake.
Figure 8:
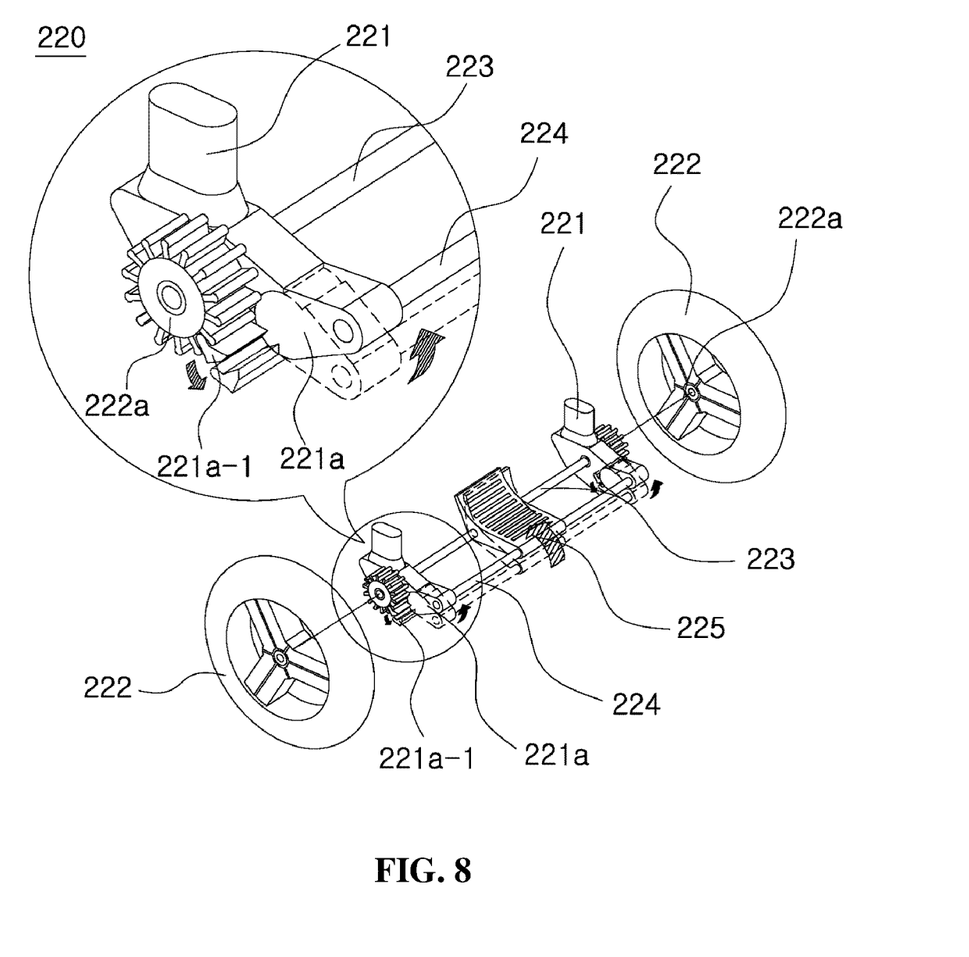
FIG. 8 is a view showing the structural elements of a rear wheel drive unit according to the present invention, with an enlarged view showing that a rotary wing and a protrusion are rotated in a state in which the protrusion is coupled to a tooth unit according to the rotation of an 'L'-shaped pedal brake, whereby rear wheels are rotated.
Figure 9:
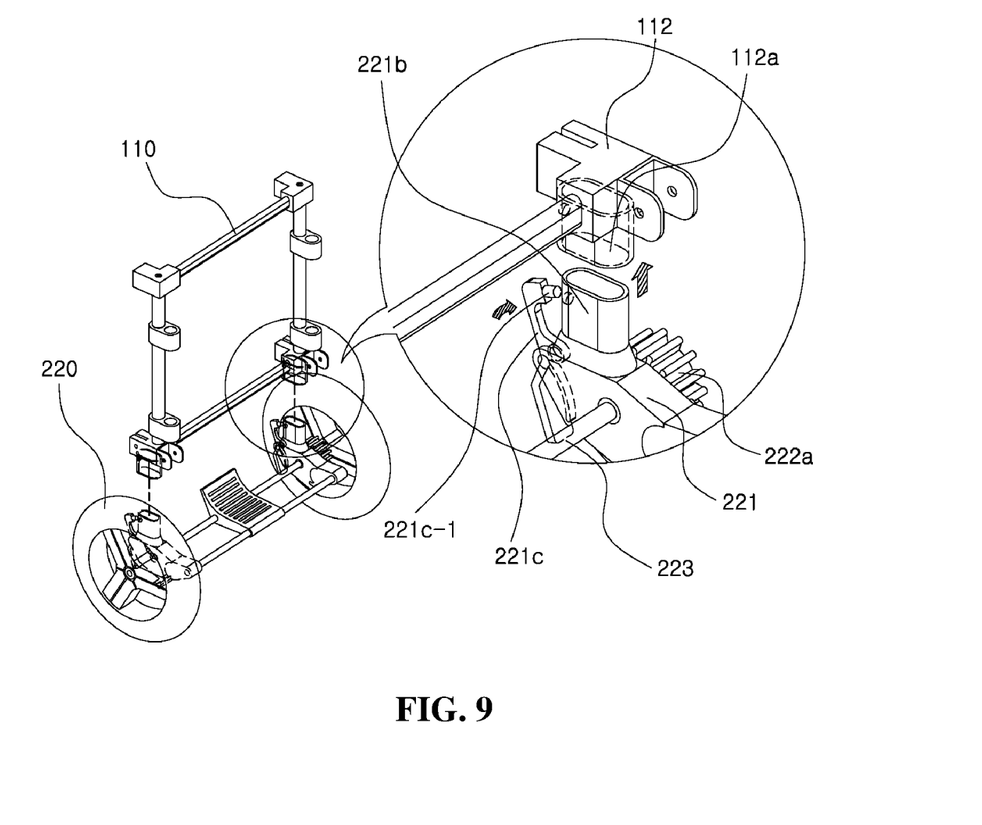
FIG. 9 is a view showing the main frame and the rear wheel drive unit, with an enlarged view showing that a rear wheel fixing frame and a lower end triaxial support fixing member according to the present invention are coupled to each other, whereby the main frame and the rear wheel drive unit are coupled to each other.

As shown in FIGS. 7 and 8, the wagon wheel unit 200 includes a front wheel drive unit 210 and a rear wheel drive unit 220.

First, the front wheel drive unit 210 according to the present invention will be described.

The front wheel drive unit 210 is configured such that a suspension fork 211 is coupled to each of the left and right sides of the lower end of the front main frame 110a and such that a push friction type brake 213 is disposed at an upper end of each of front wheels 212, which are rotatable 360-degrees in the horizontal direction.

The front wheels 212 are not fixed in a specific direction but are rotatable 360-degrees in the horizontal direction, whereby it is possible to smoothly change the direction of the baby wagon and to reduce the amount of force necessary to change the direction of the baby wagon. Consequently, it is possible to reduce the fatigue of the caregiver.

When the rear of each of the front wheels 212 is rotated toward the foot of the caregiver while the caregiver pushes the baby wagon from the front of the baby wagon in the rearward direction, the caregiver may step on the push friction type brake 213 in order to stop the rotation of each of the front wheels 212.

When the rear part of one of the push friction type brakes 213 is stepped on, the push friction type brake 213 comes into tight contact with a corresponding one of the front wheels 212, whereby the rotation of the corresponding one of the front wheels 212 can be stopped by friction. On the other hand, when the front part of one of the push friction type brakes 213 is stepped on, the push friction type brake 213 is separated from a corresponding one of the front wheels 212, whereby the rotation of the corresponding one of the front wheels 212 is allowed.

Consequently, it is possible to solve problems in that, when the caregiver wishes to stop the baby wagon while the caregiver pushes the baby wagon from the front of the baby wagon in the rearward direction in order to move the baby wagon, the caregiver must return to the rear of the baby wagon in order to step on the a pedal brake formed at the rear of the baby wagon and in that the baby wagon may be exposed to danger while the caregiver returns to the rear of the baby wagon since the baby wagon is not stably fixed.

Second, the rear wheel drive unit 220 according to the present invention will be described.

The rear wheel drive unit 220 is configured such that inner rear wheel support frames 221b formed at the upper ends of rear wheel fixing frames 221 are detachably coupled to the left and right sides of the lower end of the rear main frame 110b using pins, such that rear wheels 222 can be integrally fastened to the left and right sides of a center shaft 223 extending through the centers of the rear wheel fixing frames 221, such that a rotary wing 221a having a protrusion 221a-1 is coupled to the rear end of each of the rear wheel fixing frames 221, such that the left and right rotary wings 221a are connected to each other via a rotary shaft 224, and such that an 'L'-shaped pedal brake 225 is coupled to the middle parts of the center shaft 223 and the rotary shaft 224.

Figure 10:
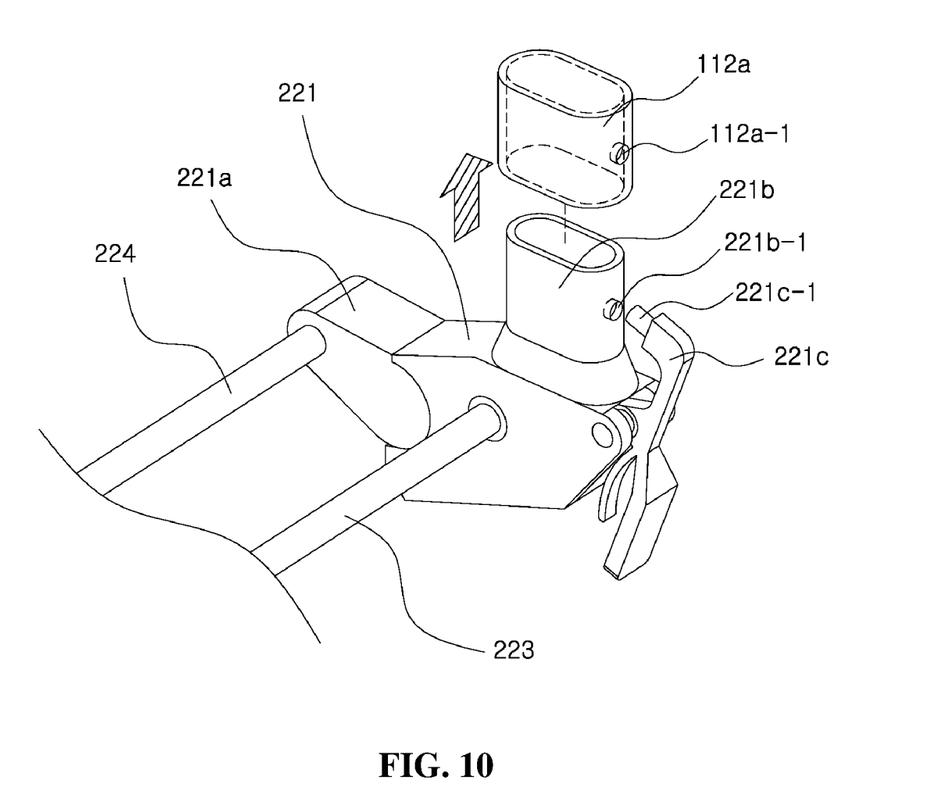
FIG. 10 is a view showing the state in which a rear wheel detachment pin of a rear wheel detachment handle according to the present invention is provided so as to face an inner through hole formed in the rear wheel fixing frame and in which an inner rear wheel support frame is inserted into an outer rear wheel support frame.

As shown in FIG. 10, each of the inner rear wheel support frames 221b is formed so as to have an outer circumference that is the same size as the inner circumference of the outer rear wheel support frame 112a, formed at the lower end of a respective one of the lower end triaxial support fixing members 112. Each of the inner rear wheel support frames 221b can be inserted into the respective one of the outer rear wheel support frames 112a from beneath. When each of the inner rear wheel support frames 221b is fully inserted into the respective one of the outer rear wheel support frames 112a, an inner through hole 221b-1 and an outer through hole 112a-1 are aligned with each other.

Figure 11:
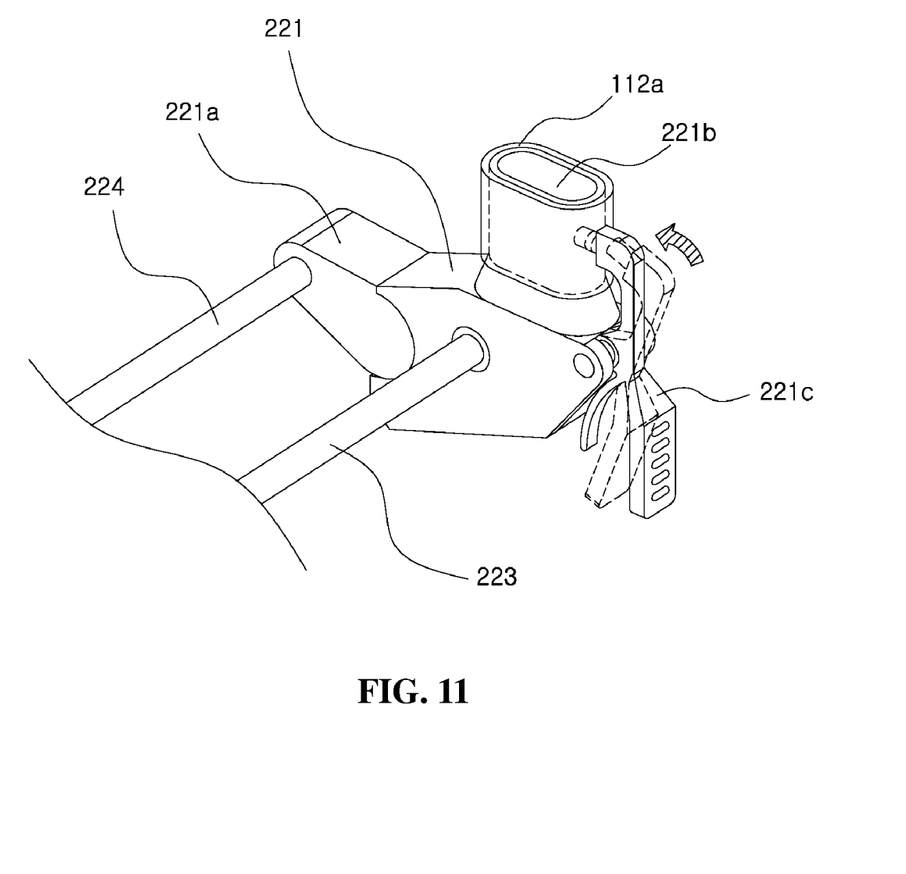
FIG. 11 is a view showing the state in which the inner rear wheel support frame according to the present invention has been inserted into the outer rear wheel support frame and in which the rear wheel detachment pin of the rear wheel detachment handle has been inserted through an outer through hole and the inner through hole.

At this time, as shown in FIG. 11, a rear wheel detachment pin 221c-1 of a rear wheel detachment handle 221c coupled to the front part of each of the rear wheel fixing frames 221 so as to be rotated about a coupling shaft is inserted through the inner through hole 221b-1 and the outer through hole 112a-1, which are aligned with each other. As a result, each of the inner rear wheel support frames 221b and the respective one of the outer rear wheel support frames 112a are fixed to each other, whereby the rear wheel drive unit 220 can be coupled to the main frame 110.

When the rear wheel detachment handle 221c is pushed, the rear wheel detachment handle 221c is rotated forward about the coupling shaft. As a result, the rear wheel detachment pin 221c-1 can be disengaged from the inner through hole 221b-1 and the outer through hole 112a-1, whereby each of the inner rear wheel support frames 221b can be separated downward from the respective one of the outer rear wheel support frames 112a.

In the wagon folding mode, therefore, the rear wheel drive unit 220, which is a large protruding portion having a large volume, can be separated from the folding type body frame 100, whereby it is possible to reduce the volume of the baby wagon 1. Consequently, it is possible to increase the efficiency of space utilization by the baby wagon and to easily store the baby wagon.

When the caregiver pulls or pushes the baby wagon at the rear of the baby wagon, the caregiver may step on the rear part of the 'L'-shaped pedal brake 225 in order to stop the rotation of the rear wheels.

When the rear part of the 'L'-shaped pedal brake 225 is stepped on, the rotary shaft is rotated downward about the center shaft 223 to rotate the left and right rotary wings 221a. At this time, the protrusion 221a-1 of each of the left and right rotary wings 221a is inserted into a tooth unit 222a formed inside the respective one of the rear wheels 222, whereby the rotation of the rear wheels 222 can be stopped. On the other hand, when the front part of the 'L'-shaped pedal brake 225 is stepped on, the protrusion 221a-1 of each of the left and right rotary wings 221a is separated from the tooth unit 222a, whereby the rotation of the rear wheels 222 is allowed.

As shown in FIG. 8, the rotation of the rear wheels 222 can be completely prevented by the protrusion 221a-1 inserted into the tooth unit 222a. Consequently, slippage of the baby wagon 1 is prevented. In addition, there is no possibility of the braked state of the baby wagon 1 being released, whereby it is possible to stably stop the baby wagon 1.

Next, the seat unit 300 according to the present invention will be described.

The seat unit 300 is formed in the shape of a rectangular basket. The seat unit 300 is coupled and fixed to the inner circumference and the lower end of the folding type body frame 100 using snap fasteners, buckles, or hook and loop fasteners. The seat unit 300 serves to provide a space in which the baby takes a comfortable rest in the baby wagon.

The seat unit 300 has a thickness of 5 mm to 10 mm. The seat unit 300 is configured so as to have folding lines such that the seat unit 300 can be folded in the folding mode of the folding type body frame 100. The seat unit 300 is provided at the center of the inner surface thereof with a folding type ring.

If the thickness of the seat unit 300 is less than 5 mm, the seat unit 300 cannot appropriately serve as a cushion, whereby vibrations and impacts are directly transmitted to the baby during the movement of the baby wagon. If the thickness of the seat unit is greater than 10 mm, on the other hand, the folding type body frame 100 is not smoothly folded, and the volume of the baby wagon is increased.

A five-point coupling type safety belt is formed at the front part and the rear part of the inside of the seat unit 300 according to the present invention so as to face the same, whereby the shoulders, the waist, and the thighs of the baby can be supported and prevented from shaking.

The five-point coupling type safety belt surrounds the entirety of the upper body. Consequently, babies or children of various ages, including babies who cannot keep themselves steady, can ride in the baby wagon.

Next, the canopy 400 according to the present invention will be described.

The canopy 400 has rectangular sides and a quadrangular pyramid-shaped roof. The canopy 400 can be detachably coupled to the upper end of the folding type body frame 100 to protect the baby from sunlight, rain, wind, and the like.

Hereinafter, the operation of the baby wagon with improved ease of use according to the present invention will be described in detail.

First, the support frame 120, which can be folded in a 'V' shape when the baby wagon is in the wagon folding mode, in which the baby wagon can be stored, can be unfolded horizontally in order to open the baby wagon.

At this time, the inner cylindrical frame parts of the main frame 110 move downward and can be inserted into the outer cylindrical frame parts of the main frame 110, and the triangular frame parts and inverted triangular frame parts of the side frames 130 can be unfolded so as to have the same contained angles.

Subsequently, the canopy fixing poles 114 can be installed at the upper end of the main frame 110, and then the canopy 400 can be coupled to the canopy fixing poles 114 by fitting the canopy 400 on the canopy fixing poles 114.

Subsequently, the shoulders, the waist, and the thighs of the baby can be supported so as not to shake using the five-point coupling type safety belt.

Subsequently, the angle of the handle frame can be adjusted in order to make it easy to push or pull the baby wagon. When the baby wagon is moved and stopped in the state in which the caregiver is located in front of the baby wagon, the baby wagon can be controlled using the push friction type brakes 213. When the baby wagon is moved and stopped in the state in which the caregiver is located at the rear of the baby wagon, on the other hand, the baby wagon can be controlled using the L'-shaped pedal brake 225.

Subsequently, after the baby wagon is used, the baby is moved to a safe place, the canopy 400 can be separated from the baby wagon, the canopy fixing poles 114 can be inserted into the main frame 110, and the folding type ring, which is formed at the center of the seat unit 300, can be pulled in order to fold the baby wagon.

In addition, the rear wheel drive unit 220 can be separated using the rear wheel detachment handles 221c in a pin detachment fashion, the basket coupled to the front of the baby wagon can be folded, and the angle adjustment handles of the front handle frame 140 and the rear handle frame 150 can be rotated so as to be parallel to the main frame 110.

Finally, the baby wagon in the wagon folding mode, in which the volume of the baby wagon can be minimized, can be put in the trunk of a car.

The invention claimed is:

1. A baby wagon with improved ease of use, comprising:
a foldable body frame having a rectangular parallelepiped shape so as to support an entire body of the baby wagon, wherein the foldable body frame includes a main frame, a support frame, side frames, a front handle frame, a rear handle frame, and a middle part configured to be folded or unfolded in a forward-rearward direction, such that a shape of the foldable body frame is variable, and wherein the main frame includes an upper end biaxial support fixing member, a lower end triaxial support fixing member, a handle fixing clip, and a canopy fixing pole;

a wagon wheel unit fastened to a front lower end and a rear lower end of the foldable body frame in order to move the baby wagon;

a seat unit having a shape of a rectangular basket, coupled and fixed to an inner circumference and a lower end of the foldable body frame using snap fasteners, buckles, or hook and loop fasteners; and a canopy having rectangular sides and a quadrangular pyramid-shaped roof, the canopy being detachably coupled to an upper end of the foldable body frame, wherein the canopy fixing pole includes a pole protrusion fixing screw thread disposed on a lower end thereof and a pole insertion fixing screw thread disposed on an upper end thereof, and wherein the pole protrusion fixing screw thread and the pole insertion fixing screw thread are selectively engaged with a screw thread disposed in a pole insertion fixing hole located in an upper end of the upper end biaxial support fixing member.

2. The baby wagon according to claim 1, wherein the handle fixing clip is manufactured by:

injecting a mixture of 79 to 90 wt % of room temperature setting epoxy resin having a viscosity at 25° C. of 700 to 850 cps and a density of 1.21 g/cm$^3$, 2 to 20 wt % of carbon fiber surface-treated with plasma, and 0.5 to 10 wt % of a hardening agent including imidazole or tertiary amine, into a mold; and hardening the mixture through a first hardening step, at which a temperature thereof is increased from 50° C. to 80° C. for 15 minutes, a second hardening step, at which the temperature thereof is maintained at 80° C. for 25 minutes, a third hardening step, at which the temperature thereof is increased from 80° C. to 120° C. for 20 minutes, a fourth hardening step, at which the temperature thereof is maintained at 120° C. for 90 minutes, and a fifth hardening step, at which the temperature thereof is decreased from 120° C. to 50° C. for 30 minutes.

3. The baby wagon according to claim 1, wherein the wagon wheel unit comprises:

a front wheel drive unit including a suspension fork coupled to each of a left and a right sides of a lower end of a front main frame and a push frictional brake disposed at an upper end of each of a left and a right front wheels, wherein the left and right front wheels each are rotatable 360-degrees in a horizontal direction; and a rear wheel drive unit including a left and a right inner rear wheel support frames disposed at a left and a right upper ends of a left and a right rear wheel fixing frames and detachably coupled to a left and a right sides of a lower end of a rear main frame using pins, respectively, wherein a left and a right rear wheels are integrally fastened to a left and a right sides of a center shaft extending through centers of the left and right rear wheel fixing frames, wherein each of a left and a right rotary wings having a protrusion is coupled to a rear end of each of the left and right rear wheel fixing frames, wherein the left and right rotary wings are connected to each other via a rotary shaft, and wherein a 'L'-shaped pedal brake is coupled to a middle portion of the center shaft and a middle portion of the rotary shaft.

* * * * *